UNITED STATES PATENT OFFICE.

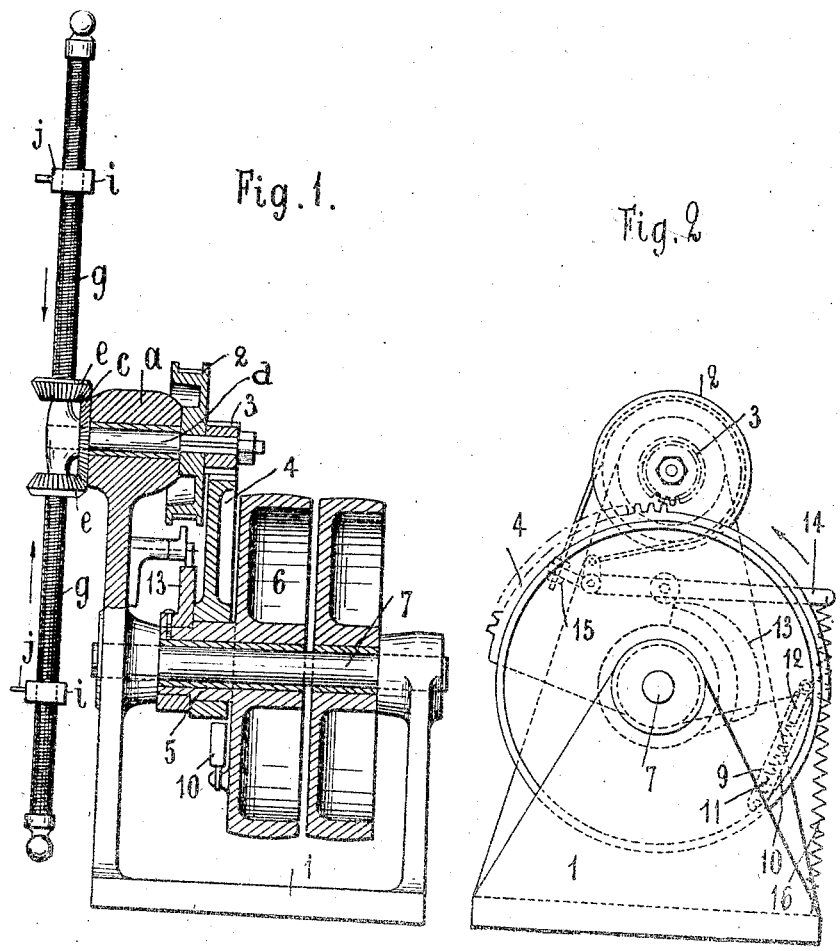

RAOUL LORY, OF ST. BENOÎT-SUR-LOIRE, FRANCE.

GEARING.

1,026,100. Specification of Letters Patent. Patented May 14, 1912.

Application filed March 6, 1911. Serial No. 612,513.

*To all whom it may concern:*

Be it known that I, RAOUL LORY, a subject of the French Republic, residing at St. Benoît-sur-Loire, Loiret, France, have invented new and useful Gearing, of which the following is a specification.

The object of my invention is to replace the hand driven mechanism by mechanical means.

The apparatus consists of a frame work supporting the mechanism, described in my application Serial No. 546527/1910.

Figure 1 is a vertical section of the apparatus, Fig. 2, is a side view of the apparatus.

The apparatus is composed of a cross piece $a$, toothed pinions $e$ which are engaged with the fixed wheel $c$ as well as with the threaded tubes $g$. The shaft $d$ carries a brake-pulley 2 instead of a crank and a toothed pinion 3, fixed on the shaft. This pinion gets an intermitting movement by means of a toothed sector which is fixed loosely on the nave 5 of the pulley 6 which latter is also fixed loosely on the shaft 7. A loose pulley is placed at one side of the pulley 6 and runs also loose upon the shaft. The movement of the sector 4 is effected by means of an elastic abutment 9, composed of a tube 10 fixed on the pulley 6, in which is placed a spring 11, being in contact with a piston 12 which is fixed on the sector 4. Close to the sector 4 is situated a cam 13 for the purpose of raising the lever 14 of the brake 2, in order to retard rotation of the wheel 2, this brake may be regulated by means of a nut 15. The lever is brought back continuously by the spring 16 which is fixed partly on the frame-work and on its exterior end on the lever 14.

The working of the apparatus is as follows: The belt drives the pulley 6, and by means of the elastic abutment 9, and also the toothed sector 4, the pinion 3 is driven. The pinion 3 is turned one or more times according to the number of the teeth of the sector until the cam 13 raises the roller of the lever 14, this effects the braking of the pulley 2 by means of its brake-band; an easy action, because the pinion 3 is at this time no more in touch with the teeth of the sector 4. The time of stopping the apparatus is necessary in order to place the locks of hair between the two wires, and while the rotation of the pulley 6 continues, the cam 13, leaves the lever 14, and the latter becomes engaged by the spring. The sector engages itself at once with the first tooth of the pinion and by means of the elastic abutment a sudden shock is avoided which would break the teeth in a short time; the starting of the apparatus is consequently progressive.

While I have herein shown and described one embodiment of my invention it will be understood that I do not wish to be limited thereto except for such limitations as the claims enforce.

What I do claim as my invention, and desire to secure by Letters Patent, is—

1. An apparatus of the class described comprising in combination, a shaft, a brake wheel and a pinion on said shaft, a sector for driving said pinion, a driving pulley and a yielding connection between said pulley and sector, a cam driven by said pulley, and brake mechanism actuated by said cam and coacting with said brake wheel to arrest rotation of the shaft when said sector is out of gear with said pinion.

2. An apparatus of the class described comprising in combination, a driven shaft and a brake member therefor, means for intermittently driving said shaft, a driving pulley and a yielding connection between said pulley and said means, and brake mechanism actuated by said pulley and coacting with said brake member to arrest rotation of said shaft when the latter is not driven by said means, substantially as described.

In testimony whereof I affix my signature in presence of two witnesses.

RAOUL LORY.

Witnesses:
HENRI BOETTCHER,
BARTLEY F. YOST.